US 12,153,602 B2

(12) United States Patent
Breß et al.

(10) Patent No.: US 12,153,602 B2
(45) Date of Patent: *Nov. 26, 2024

(54) QUERY PROCESSING USING A DISTRIBUTED STOP OPERATOR

(71) Applicant: Snowflake Inc., Bozeman, MT (US)

(72) Inventors: Sebastian Breß, Berlin (DE); Moritz Eyssen, Berlin (DE); Max Heimel, Berlin (DE)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/815,389

(22) Filed: Jul. 27, 2022

(65) Prior Publication Data

US 2022/0382782 A1    Dec. 1, 2022

Related U.S. Application Data

(63) Continuation of application No. 17/517,935, filed on Nov. 3, 2021, now Pat. No. 11,436,253, which is a continuation of application No. 17/237,340, filed on Apr. 22, 2021, now Pat. No. 11,188,563, which is a continuation of application No. 17/077,403, filed on Oct. 22, 2020, now Pat. No. 11,023,491, which is a
(Continued)

(51) Int. Cl.
*G06F 16/00* (2019.01)
*G06F 16/2455* (2019.01)
*G06F 16/27* (2019.01)

(52) U.S. Cl.
CPC ........ *G06F 16/27* (2019.01); *G06F 16/24553* (2019.01)

(58) Field of Classification Search
CPC .................. G06F 16/27; G06F 16/24553
USPC ........................................... 707/770
See application file for complete search history.

(56) References Cited

U.S. PATENT DOCUMENTS

| 5,668,987 A | 9/1997 | Schneider |
| 5,884,299 A | 3/1999 | Ramesh et al. |
| 6,363,411 B1 | 3/2002 | Dugan et al. |

(Continued)

OTHER PUBLICATIONS

U.S. Appl. No. 16/855,372 U.S. Pat. No. 10,860,609, filed Apr. 22, 2020, Distributed Stop Operator for Query Processing.

(Continued)

*Primary Examiner* — Monica M Pyo
(74) *Attorney, Agent, or Firm* — Schwegman Lundberg & Woessner, P.A.

(57) ABSTRACT

A global and local row count limit associated with a limit query are received by a stop operator of a first execution node among a set of execution nodes that are assigned to process the limit query. Local distributed row count data is generated based on a local row count corresponding to a number of rows output by the first execution node in processing the query. Based on determining the local row count satisfies the local limit, the first execution node buffers rows produced in processing the query. The local distributed row count data is updated based on remote distributed row count data received from a second execution node. A stopping condition is detected based on determining the global limit is satisfied based on updated local distributed row count data and query processing by the first execution node based on detecting the stopping condition.

20 Claims, 9 Drawing Sheets

Related U.S. Application Data continuation of application No. 16/855,372, filed on Apr. 22, 2020, now Pat. No. 10,860,609.

(60) Provisional application No. 62/994,646, filed on Mar. 25, 2020.

(56) References Cited

U.S. PATENT DOCUMENTS

| | | | |
|---|---|---|---|
| 6,523,036 | B1 | 2/2003 | Hickman et al. |
| 7,028,073 | B1 | 4/2006 | Bui et al. |
| 7,984,043 | B1* | 7/2011 | Waas ................ G06F 16/8358 707/718 |
| 8,392,400 | B1 | 3/2013 | Ransil et al. |
| 8,832,157 | B1 | 9/2014 | Shatdal et al. |
| 9,053,167 | B1 | 6/2015 | Swift et al. |
| 9,229,983 | B2 | 1/2016 | Yu et al. |
| 9,489,443 | B1 | 11/2016 | Muniswamy-reddy et al. |
| 9,544,373 | B2 | 1/2017 | Poletto et al. |
| 9,892,163 | B2 | 2/2018 | Kim et al. |
| 10,860,609 | B1 | 12/2020 | Breßet al. |
| 11,023,491 | B1 | 6/2021 | Breßet al. |
| 11,188,563 | B2 | 11/2021 | Breßet al. |
| 11,657,047 | B1* | 5/2023 | Shivarathri ......... G06F 11/3409 707/764 |
| 2002/0143728 | A1 | 10/2002 | Cotner et al. |
| 2003/0229640 | A1 | 12/2003 | Carlson et al. |
| 2006/0101081 | A1 | 5/2006 | Lin et al. |
| 2006/0241822 | A1 | 10/2006 | Yadappanavar et al. |
| 2007/0260611 | A1 | 11/2007 | Bohannon et al. |
| 2008/0082555 | A1 | 4/2008 | Salmon et al. |
| 2009/0049358 | A1 | 2/2009 | Jalloul et al. |
| 2009/0234800 | A1* | 9/2009 | Antani ................ G06F 16/2453 |
| 2010/0238941 | A1 | 9/2010 | Matsuo |
| 2012/0330988 | A1* | 12/2012 | Christie ................. G06F 16/25 707/E17.054 |
| 2012/0331010 | A1 | 12/2012 | Christie |
| 2013/0239093 | A1* | 9/2013 | Nori .................... G06F 9/44589 717/126 |
| 2014/0082028 | A1* | 3/2014 | Sivasubramanian ........................ G06F 16/215 707/803 |
| 2014/0156632 | A1 | 6/2014 | Yu et al. |
| 2014/0278754 | A1 | 9/2014 | Cronin et al. |
| 2015/0149442 | A1 | 5/2015 | Kim et al. |
| 2015/0269239 | A1* | 9/2015 | Swift ..................... G06F 16/27 707/610 |
| 2015/0278397 | A1 | 10/2015 | Hendrickson et al. |
| 2015/0317359 | A1 | 11/2015 | Tran et al. |
| 2016/0147837 | A1* | 5/2016 | Nguyen ................ G06F 16/245 707/771 |
| 2017/0075949 | A1* | 3/2017 | Stefani .................. G06F 16/235 |
| 2018/0060400 | A1 | 3/2018 | Wu et al. |
| 2020/0004757 | A1 | 1/2020 | Hirose et al. |
| 2021/0303593 | A1 | 9/2021 | Breßet al. |
| 2022/0058206 | A1 | 2/2022 | Breßet al. |

OTHER PUBLICATIONS

U.S. Appl. No. 17/077,403 U.S. Pat. No. 11,023,491, filed Oct. 22, 2020, Limit Query Processing Using Distributed Stop Operator.

U.S. Appl. No. 17/517,935, filed Nov. 3, 2021, Distributed Stop Operator for Limit Queries.

U.S. Appl. No. 17/237,340 U.S. Pat. No. 11,188,563, filed Apr. 22, 2021, Processing Limit Queries Using Distributed Stop Operator.

"U.S. Appl. No. 16/855,372, Examiner Interview Summary mailed Sep. 16, 2020", 3 pgs.

"U.S. Appl. No. 16/855,372, Non-Final Office Action mailed Jun. 15, 2020", 22 pgs.

"U.S. Appl. No. 16/855,372, Notice of Allowance mailed Oct. 7, 2020", 9 pgs.

"U.S. Appl. No. 16/855,372, Response filed Sep. 14, 2020 to Non-Final Office Action mailed Jun. 15, 2020", 14 pgs.

"U.S. Appl. No. 17/077,403, Examiner Interview Summary mailed Mar. 12, 2021", 2 pgs.

"U.S. Appl. No. 17/077,403, Non-Final Office Action mailed Dec. 11, 2020", 30 pgs.

"U.S. Appl. No. 17/077,403, Notice of Allowance mailed Apr. 5, 2021", 9 pgs.

"U.S. Appl. No. 17/077,403, Response filed Mar. 10, 2021 to Non-Final Office Action mailed Dec. 11, 2020", 13 pgs.

"U.S. Appl. No. 17/237,340, Examiner Interview Summary mailed Oct. 1, 2021", 2 pgs.

"U.S. Appl. No. 17/237,340, Non-Final Office Action mailed Jun. 29, 2021", 34 pgs.

"U.S. Appl. No. 17/237,340, Notice of Allowance mailed Oct. 15, 2021", 11 pgs.

"U.S. Appl. No. 17/237,340, Response filed Sep. 28, 2021 to Non-Final Office Action mailed Jun. 29, 2021", 12 pgs.

"U.S. Appl. No. 17/517,935, Non-Final Office Action mailed Feb. 7, 2022", 36 pgs.

"U.S. Appl. No. 17/517,935, Notice of Allowance mailed May 27, 2022", 9 pgs.

"U.S. Appl. No. 17/517,935, Response filed May 9, 2022 to Non-Final Office Action mailed Feb. 7, 2022", 12 pgs.

* cited by examiner

QUERY PROCESSING USING A DISTRIBUTED STOP OPERATOR

CROSS-REFERENCE TO RELATED APPLICATIONS

This application is a Continuation of U.S. patent application Ser. No. 17/517,935 filed Nov. 3, 2021, which is a Continuation of U.S. patent application Ser. No. 17/237,340 filed on Apr. 22, 2021 and issued on Nov. 30, 2021 as U.S. Pat. No. 11,188,563; which is a Continuation of U.S. patent application Ser. No. 17/077,403 filed on Oct. 22, 2020 and issued on Jun. 1, 2021 as U.S. Pat. No. 11,023,491; which is a Continuation of U.S. patent application Ser. No. 16/855,372 filed on Apr. 22, 2020 and issued on Dec. 8, 2020 as U.S. Pat. No. 10,860,609; which claims priority to U.S. Provisional Patent Application No. 62/994,646 filed on Mar. 25, 2020, the contents of which are incorporated herein by reference in their entireties.

TECHNICAL FIELD

Embodiments of the disclosure relate generally to databases and, more specifically, to a distributed stop operator for database query processing.

BACKGROUND

Databases are widely used for data storage and access in computing applications. A goal of database storage is to provide enormous sums of information in an organized manner so that it can be accessed, managed, and updated. In a database, data may be organized into rows, columns, and tables. Databases are used by various entities and companies for storing information that may need to be accessed or analyzed.

When certain information is to be extracted from a database, a query statement may be executed against the database data. A query execution system processes the query and returns certain data according to one or more query predicates that indicate what information should be returned by the query. In some instances, a query can include a parameter that defines a row count limit that defines a limit on a number of database rows that are returned by the query. A query that specifies a row count limit on results is referred to hereinafter as a "limit query."

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
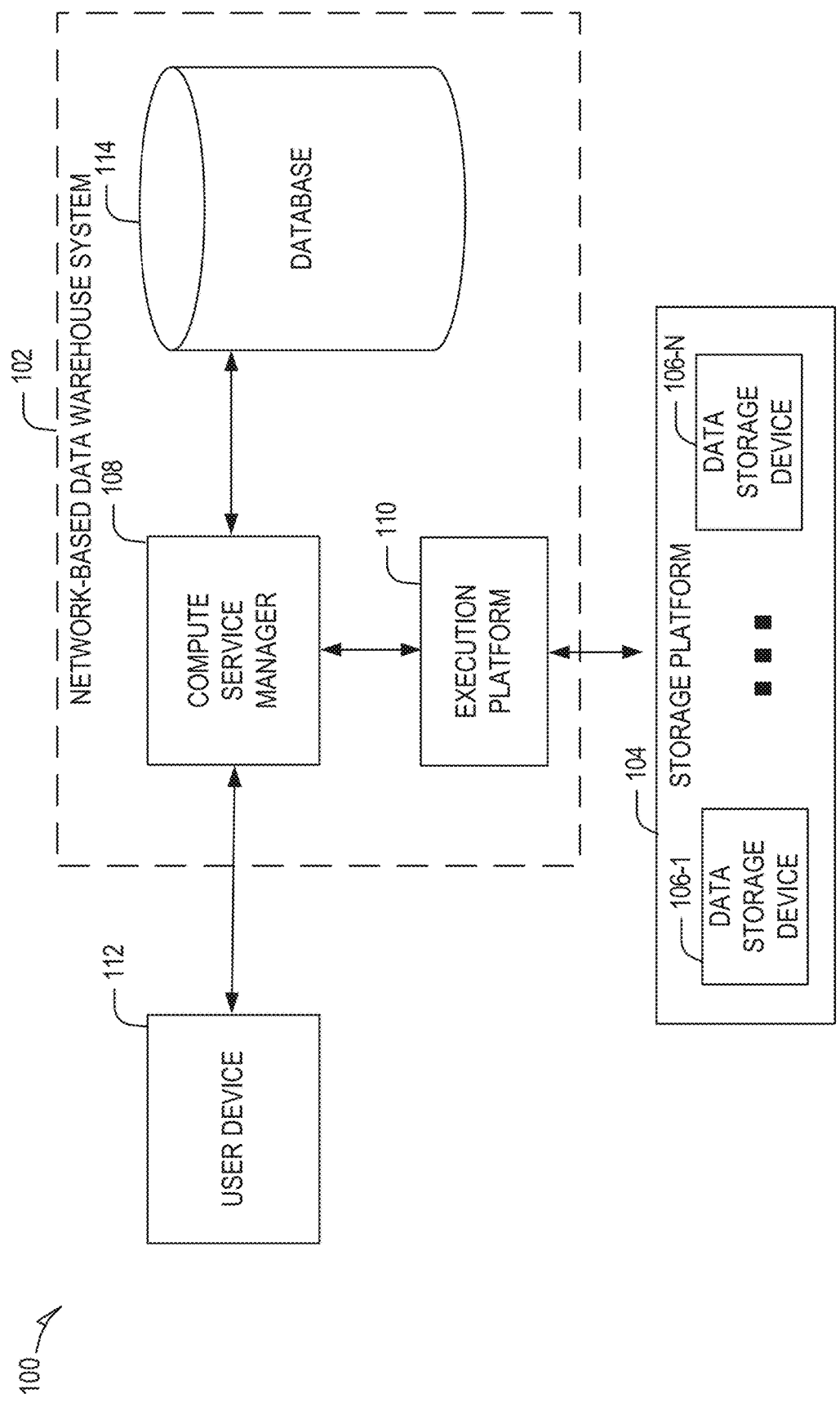
FIG. 1 is a block diagram illustrating an example computing environment that includes a network-based data warehouse system in communication with a cloud storage provider system, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

As noted above, a limit query specifies a row count limit that defines a limit on the number of rows from a database that are to be returned in response to the query. In many current query execution platforms, query processing is spread across multiple execution nodes, each of which operate in parallel to execute a query against a particular segment of the database. However, in processing limit queries, each execution node sends a set of rows resulting from processing the query to a single synchronization node to serialize the query results. As a result, conventional processing of limit queries leads to serial execution of downstream operators, which degrades overall query processing performance, particularly for queries with large limit thresholds.

Aspects of the present disclosure address the above and other challenges in processing limit queries by using an execution platform that distributes row count limits among each execution node that is responsible for processing a given limit query. More specifically, a row count limit specified in a limit query is used to establish a global limit that defines a limit on the total number of rows produced by a set of execution nodes that are responsible for processing the query. Each execution node is assigned a local limit that defines a limit on the number of rows produced by that execution node. The local limit can be determined based on the number of execution nodes in the set. For example, given a global limit N and a number of execution nodes M, each execution node may be assigned a local limit of N/M. If N/M yields a remainder, one or more execution nodes are allowed to produce an additional row.

In processing the limit query, each execution node in the set of execution nodes produces rows until either its input (e.g., the segment of the database assigned to the execution node) is completely consumed or the global limit is reached. If an execution node exhausts its input and terminates before producing enough rows to reach the local limit, the local limit of other execution nodes in the set is to be increased. The increase to the local limit is based on a remaining count of rows in the local limit of the terminated execution node and the active number of execution nodes. Once the number of rows output by an execution node reaches the local limit, the execution node begins to buffer produced rows into a single thread stream. The execution node continues to buffer rows until the execution node exhausts its input or the sum of known globally produced rows and globally buffered rows reach the global limit, at which the execution node moves to a synchronization state.

In the synchronization state, an execution node synchronizes with the other execution nodes to determine whether the global limit has been reached based on the total number of global output rows. If not and if there are still rows in one or more local buffers, the execution nodes determine how many additional rows can be output from each node's local buffer. Each execution node then outputs rows from its local buffer according to this determination.

A synchronization protocol is used to communicate distributed row count information between execution nodes to allow execution nodes to increase local limits if other execution nodes have terminated without reaching their local limit. The distributed row count information also enables the execution nodes to detect a stopping condition based on the sum of the global number of produced rows and the global number of buffered rows reaching the global limit. The distributed row count information includes a produced row count (also referred to simply as "row count") and a buffered row count (also referred to simply as "buffer count") for each execution node along with an indication of whether each execution node has terminated. The synchronization protocol may, for example, be based on a gossip protocol in which distributed row count information is propagated amongst execution nodes by having each execution node send its local distributed count information to one or more other execution nodes chosen at random.

By distributing the global row count among the execution nodes, the execution platform supports more efficient processing of limit queries by enabling parallelization of downstream operations after the global limit is reached. That is, the execution platform avoids the query processing performance degradation issues that result from current processing techniques in which result data is sent to a single synchronization point.

FIG. 1 illustrates an example computing environment 100 that includes a network-based data processing system in the example form of a data warehouse system 102 that is in communication with a storage platform 104. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the computing environment 100 comprises the network-based data warehouse system 102 and the storage platform 104 (e.g., AWS®, Microsoft Azure Blob Storage®, or Google Cloud Storage®). The network-based data warehouse system 102 is used for reporting and analysis of integrated data from one or more disparate sources including storage devices 106-1 to 106-N within the storage platform 104. The storage platform 104 comprises a plurality of computing machines and provides on-demand computer system resources such as data storage and computing power to the network-based data warehouse system 102.

The network-based data warehouse system 102 comprises a compute service manager 108, an execution platform 110, and a database 114. The network-based data warehouse system 102 hosts and provides data reporting and analysis services to multiple client accounts. Administrative users can create and manage identities (e.g., users, roles, and groups) and use permissions to allow or deny access to the identities to resources and services.

The compute service manager 108 coordinates and manages operations of the network-based data warehouse system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a user device 112. The user device 112 corresponds to a user of one of the multiple client accounts supported by the network-based data warehouse system 102. In some embodiments, the compute service manager 108 does not receive any direct communications from the user device 112 and only receives communications concerning jobs from a queue within the network-based data warehouse system 102.

The compute service manager 108 is also coupled to database 114, which is associated with the data stored in the computing environment 100. The database 114 stores data pertaining to various functions and aspects associated with the network-based data warehouse system 102 and its users. In some embodiments, the database 114 includes a summary of data stored in remote data storage systems as well as data available from a local buffer. Additionally, the database 114 may include information regarding how data is organized in remote data storage systems (e.g., the storage platform 104) and the local buffers. The database 114 allows systems and services to determine whether a piece of data needs to be accessed without loading or accessing the actual data from a storage device.

In some embodiments, the compute service manager 108 may determine that a job should be performed based on data from the database 114. In such embodiments, the compute service manager 108 may scan the data and determine that a job should be performed to improve data organization or database performance. In some embodiments, the compute service manager 108 determines that a job should be performed based on a trigger event and stores the job in a queue until the compute service manager 108 is ready to schedule and manage the execution of the job.

The compute service manager 108 is further coupled to the execution platform 110, which provides multiple computing resources that execute various data storage and data retrieval tasks. The execution platform 110 is coupled to storage platform 104 of the storage platform 104. The storage platform 104 comprises multiple data storage devices 106-1 to 106-N. In some embodiments, the data storage devices 106-1 to 106-N are cloud-based storage devices located in one or more geographic locations. For example, the data storage devices 106-1 to 106-N may be part of a public cloud infrastructure or a private cloud infrastructure. The data storage devices 106-1 to 106-N may be hard disk drives (HDDs), solid state drives (SSDs), storage clusters, Amazon S3™ storage systems or any other data storage technology. Additionally, the storage platform 104 may include distributed file systems (e.g., Hadoop Distributed File Systems (HDFS)), object storage systems, and the like.

The execution platform 110 comprises a plurality of execution nodes. A set of processes on an execution node executes a query plan compiled by the compute service manager 108. The set of processes can include: a first process to execute the query plan; a second process to monitor and delete micro-partition files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other execution nodes of the execution platform 110. In some embodiments, an execution node may further include a stop operator that is responsible for aiding the execution node in processing limit queries. The stop operator monitors the number of rows produced by the execution node, manages communication of row count information with other execution nodes (e.g., according to the gossip protocol), compiles row count information into a local distributed row count table, and determines when local and global limits have been reached. The stop operator is also responsible for instructing the execution node to buffer rows once the local limit is reached and to stop producing rows once the global limit has been reached.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, the data storage devices 106-1 to 106-N are decoupled from the computing resources associated with the execution platform 110. This architecture supports dynamic changes to the network-based data warehouse system 102 based on the changing data storage/retrieval needs as well as the changing needs of the users and systems. The support of dynamic changes allows the network-based data warehouse system 102 to scale quickly in response to changing demands on the systems and components within the network-based data warehouse system 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 108, database 114, execution platform 110, and storage platform 104 are shown in FIG. 1 as individual discrete components. However, each of the compute service manager 108, database 114, execution platform 110, and storage platform 104 may be implemented as a distributed system (e.g., distributed across multiple systems/platforms at multiple geographic locations). Additionally, each of the compute service manager 108, database 114, execution platform 110, and storage platform 104 can be scaled up or down (independently of one another) depending on changes to the requests received and the changing needs of the network-based data warehouse system 102. Thus, in the described embodiments, the network-based data warehouse system 102 is dynamic and supports regular changes to meet the current data processing needs.

During typical operation, the network-based data warehouse system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in the database 114 assists the compute service manager 108 in determining which nodes in the execution platform 110 have already cached at least a portion of the data needed to process the task. One or more nodes in the execution platform 110 process the task using data cached by the nodes and, if further useful, data retrieved from the storage platform 104. It is desirable to retrieve as much data as possible from caches within the execution platform 110 because the retrieval speed is typically much faster than retrieving data from the storage platform 104.

As shown in FIG. 1, the computing environment 100 separates the execution platform 110 from the storage platform 104. In this arrangement, the processing resources and cache resources in the execution platform 110 operate independently of the data storage devices 106-1 to 106-N in the storage platform 104. Thus, the computing resources and cache resources are not restricted to specific data storage devices 106-1 to 106-N. Instead, all computing resources and all cache resources may retrieve data from, and store data to, any of the data storage resources in the storage platform 104.

Figure 2:
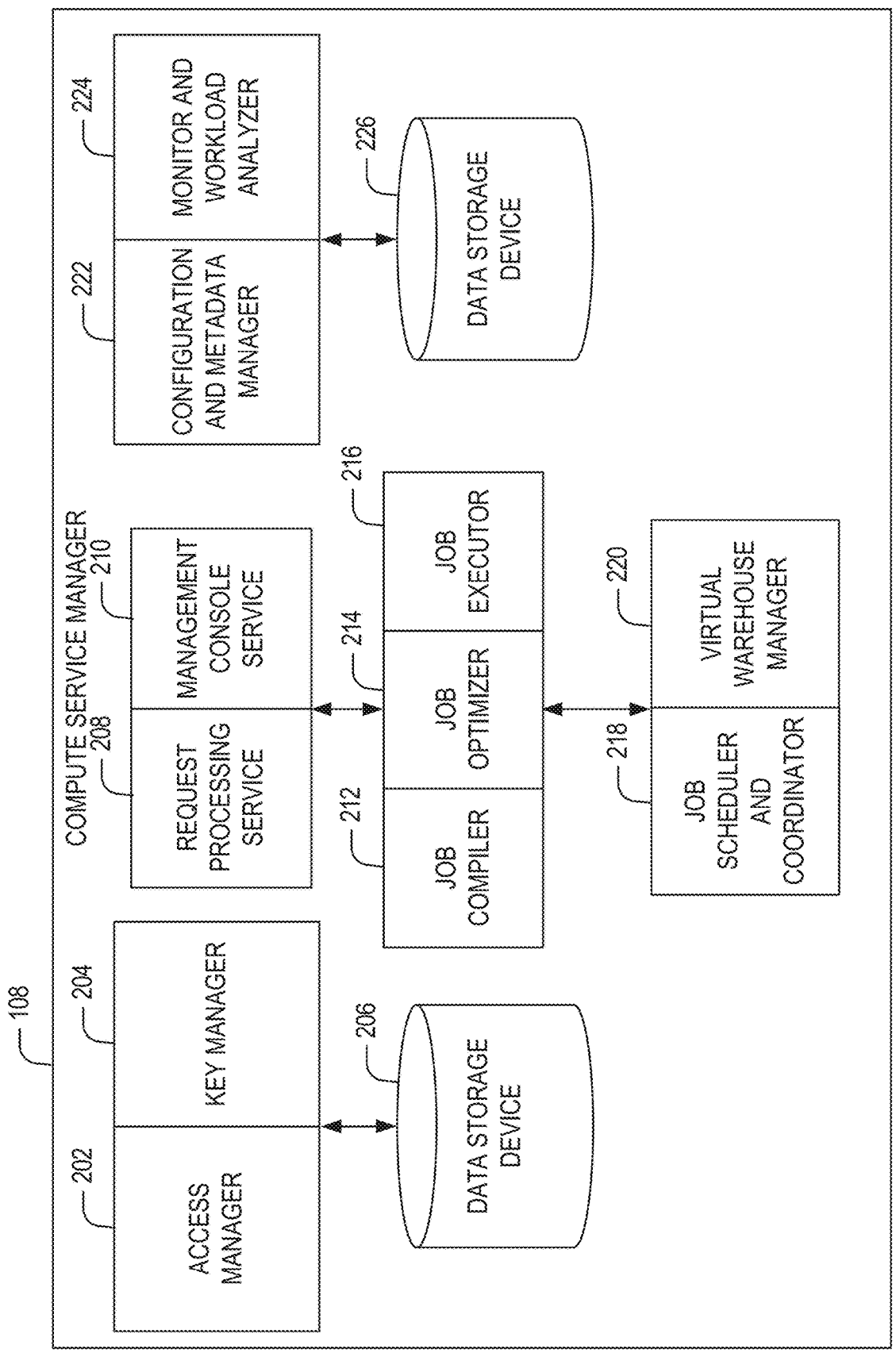
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a key manager 204 coupled to a data storage device 206. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in storage platform 104). As used herein, the remote storage devices may also be referred to as "persistent storage devices" or "shared storage devices."

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries. For query plans for executing limit queries, the virtual warehouse manager 220 may determine a global limit based on a limit value in the limit query, and may further determine local limits based on the global limits. As will be discussed further below, a local limit is a portion of a global limit determined based on the number of execution nodes assigned to process a query.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses the metadata to determine which data micro-partitions need to be accessed to retrieve data for processing a particular task or job. A monitor and workload analyzer 224 oversee processes performed by the compute service manager 108 and manages the distribution of tasks (e.g., workload) across the virtual warehouses and execution nodes in the execution platform 110. The monitor and workload analyzer 224 also redistribute tasks, as needed, based on changing workloads throughout the network-based data warehouse system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the network-based data warehouse system 102. For example, data storage device 226 may represent buffers in execution platform 110, storage devices in storage platform 104, or any other storage device.

Figure 3:
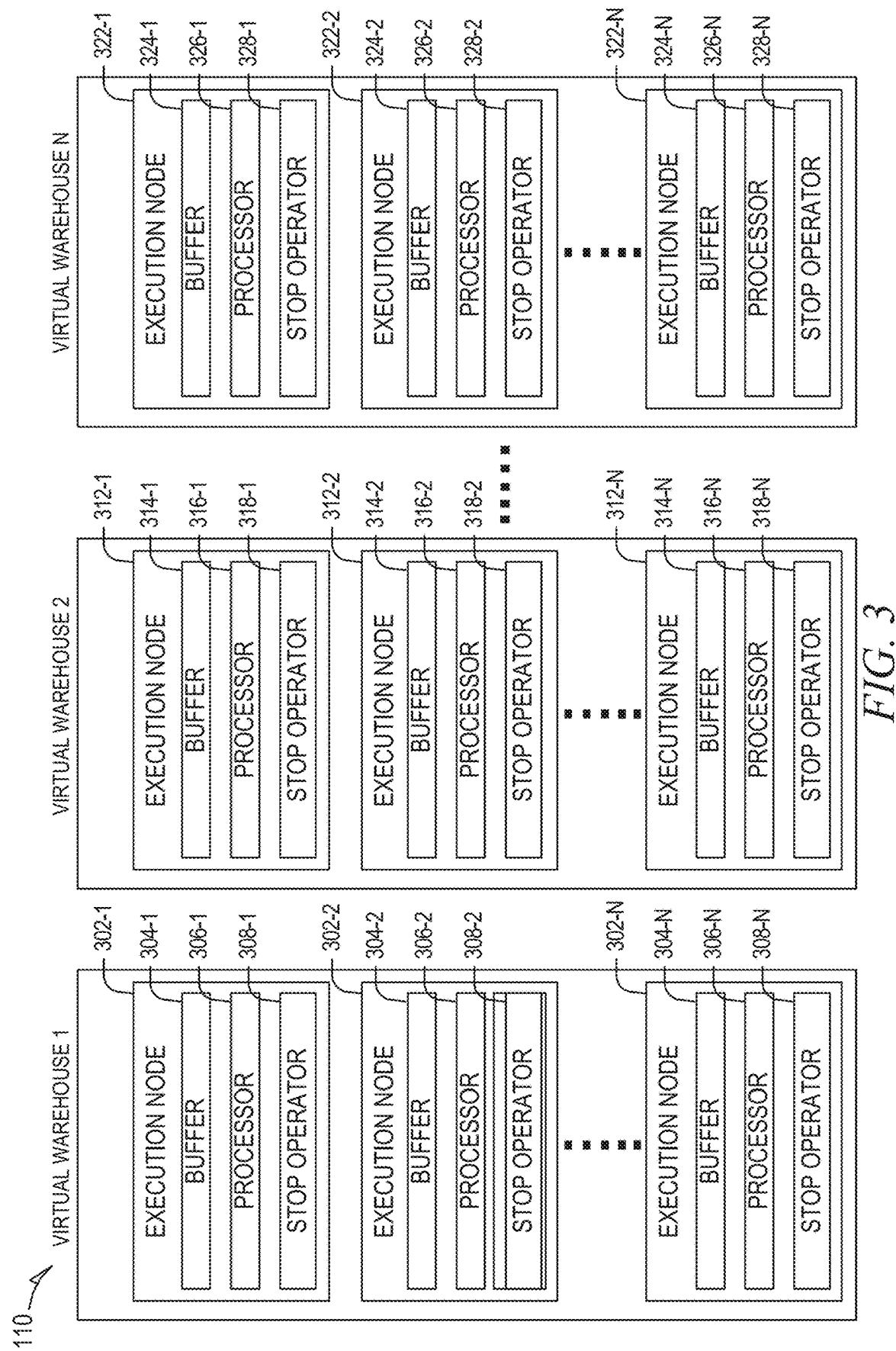
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each includes a data buffer, a processor, and a stop operator. The virtual warehouses can execute multiple tasks in parallel by using the multiple execution nodes. All virtual warehouses can access data from any data storage device (e.g., any storage device in storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer useful.

Each virtual warehouse is capable of accessing any of the data storage devices 106-1 to 106-N shown in FIG. 1. Thus, the virtual warehouses are not necessarily assigned to a specific data storage device 106-1 to 106-$n$ and, instead, can access data from any of the data storage devices 106-1 to 106-N within the storage platform 104. Similarly, each of the execution nodes shown in FIG. 3 can access data from any of the data storage devices 106-1 to 106-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-$n$. Execution node 302-1 includes a buffer 304-1, a processor 306-1, and a stop operator 308-1. Execution node 302-2 includes a buffer 304-2, a processor 306-2, and a stop operator 308-2. Execution node 302-$n$ includes a buffer 304-$n$, a processor 306-$n$, and a stop operator 308-$n$. Each execution node 302-1, 302-2, and 302-$n$ is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-$n$. Execution node 312-1 includes a buffer 314-1, a processor 316-1, and a stop operator 318-1. Execution node 312-2 includes a buffer 314-2, a processor 316-2, and a stop operator 318-2. Execution node 312-$n$ includes a buffer 314-$n$, a processor 316-$n$, and a stop operator 318-$n$. Additionally, virtual warehouse 3 includes three execution nodes 322-1, 322-2, and 322-$n$. Execution node 322-1 includes a buffer 324-1, a processor 326-1, and a stop operator 328-1. Execution node 322-2 includes a buffer 324-2, a processor 326-2, and a stop operator 328-2. Execution node 322-$n$ includes a buffer 324-$n$, a processor 326-$n$, and a stop operator 328-$n$.

The stop operator within each execution node is responsible for monitoring the number of rows produced by the execution node, managing communication of row count information with other execution nodes (e.g., according to the gossip protocol), compiling row count information into a local distributed row count table, and determining when local and global limits have been reached. The stop operator is also responsible for instructing the execution node to buffer rows once the local limit is reached and to stop query processing once the global limit has been reached.

Although the execution nodes shown in FIG. 3 each include one data buffer and one processor, alternate embodiments may include execution nodes containing any number of processors and any number of buffers. Additionally, the buffers may vary in size among the different execution nodes. The buffers shown in FIG. 3 store, in the local execution node, data that was retrieved from one or more data storage devices in storage platform 104. Thus, the buffers reduce or eliminate the bottleneck problems occurring in platforms that consistently retrieve data from remote storage systems. Instead of repeatedly accessing data from the remote storage devices, the systems and methods described herein access data from the buffers in the execution nodes, which is significantly faster and avoids the bottleneck problem discussed above. In some embodiments, the buffers are implemented using high-speed memory devices that provide fast access to the buffered data. Each buffer can store data from any of the storage devices in the storage platform 104.

Further, the buffer resources and computing resources may vary between different execution nodes. For example, one execution node may contain significant computing resources and minimal buffer resources, making the execution node useful for tasks that may use significant computing resources. Another execution node may contain significant buffer resources and minimal computing resources, making this execution node useful for tasks that may use caching of large amounts of data. Yet another execution node may contain buffer resources providing faster input-output operations, useful for tasks that may use fast scanning of large amounts of data. In some embodiments, the buffer resources and computing resources associated with a particular execution node are determined when the execution node is created, based on the expected tasks to be performed by the execution node.

Additionally, the buffer resources and computing resources associated with a particular execution node may change over time based on changing tasks performed by the execution node. For example, an execution node may be assigned more processing resources if the tasks performed by the execution node become more processor-intensive. Similarly, an execution node may be assigned more buffer resources if the tasks performed by the execution node may use a larger buffer capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-n at a different computing platform at another geographic location. Selecting particular computing systems to implement an execution node may depend on various factors, such as the level of resources needed for a particular execution node (e.g., processing resource requirements and buffer requirements), the resources available at particular computing systems, communication capabilities of networks within a geographic location or between geographic locations, and which computing systems are already implementing other execution nodes in the virtual warehouse.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer useful.

Figure 4:
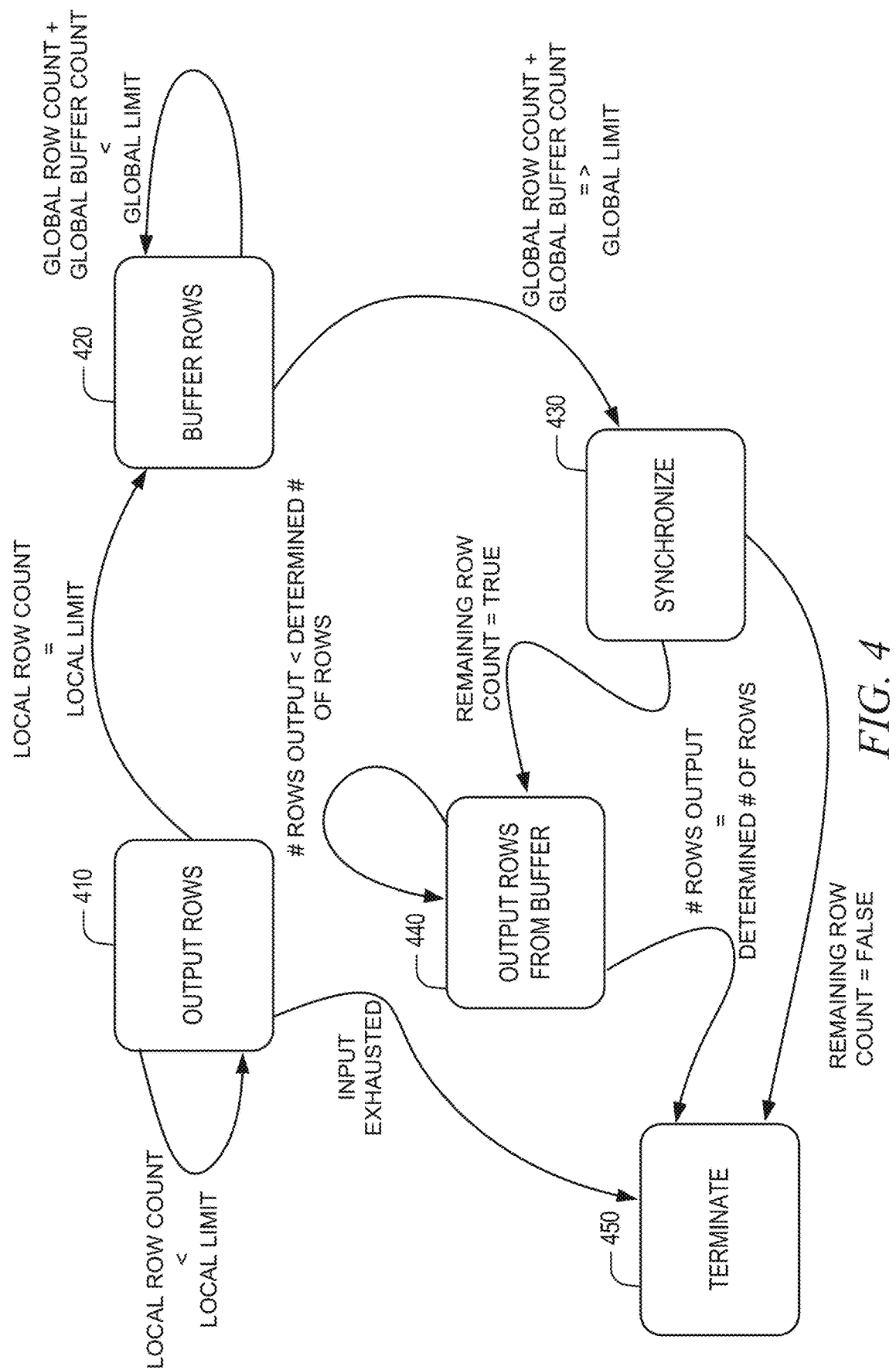
FIG. 4 is a state diagram describing behavior of an execution node of the execution platform, in accordance with some embodiments of the present disclosure.

FIG. 4 is a state diagram describing behavior of an execution node of the execution platform 110, in accordance with some embodiments of the present disclosure. In the context of FIG. 4, a limit query directed to a database in the storage platform 104 is received by the compute service manager 108 from the user device 112. The limit query includes a parameter that defines a limit on a number of rows to be returned in response to the query. The computer service manager 108 generates a query plan for executing the query against the database and provides the query plan to the execution platform 110. The query plan includes a global limit based on the limit specified in the query. The global limit defines a limit on the number of rows output by a set of execution nodes in the execution platform 110 that are responsible for processing the query. The query plan further specifies a local limit for each execution node. A local limit defines a limit on the number of rows output by a corresponding execution node in processing the query. In some embodiments, the local limit is determined based on the global limit and the number of execution nodes assigned to processing the query. For example, a local limit may be determined by dividing the global limit N by the number of execution nodes M (N/M). If N/M yields a remainder, one or more execution nodes are assigned an extra row. The query plan is provided to a set of execution nodes within the execution platform 110, and the query plan may further specify a segment of the database (e.g., a micro-partition) that is assigned to each execution node. The segment of the database to which a particular execution node is responsible for processing, is provided as input to the execution node.

Upon receiving the query plan, the execution node is initiated in state 410 where the execution node outputs rows that are produced in processing the query against the database. The execution node remains in state 410 as long as the number of rows output by the execution node (referred to as a "local row count") is below the local limit or until the execution node exhausts its input, upon which the execution node terminates. As noted above, an execution node may be assigned to a particular segment of the database, which is provided to the execution node as input, and the execution node terminates once it has searched the entire segment of the database for rows that are to be returned in response to the query. If the execution node exhausts its input, the execution node terminates at state 450.

When the local row count reaches the local limit (i.e., local row count=local limit), the execution node moves to state 420 where the execution nodes buffers rows in a per-instance stream rather than outputting them to downstream processes. The execution node will continue to buffer rows until its input is exhausted or until the sum of all rows output by the set of execution nodes and the global number of rows in local buffers reach the global limit, at which time the execution node can discard any rows from its input and wait for termination of all operator instances.

Once the sum of all rows output by the set of execution nodes and the global number of rows in local buffers of the set of execution node reach the global limit, the execution node moves to state 430 where the execution node synchronizes with the other execution nodes assigned to processing the query and determines whether the global limit was reached and if not, whether there are still rows in any local buffers. The execution nodes further determine how many rows each execution node is assigned to output from their buffers. That is, the execution nodes determine to what extent the local limit assigned to each execution node can be increased. The set of nodes synchronize by exchanging distributed row count data according to a synchronization protocol. Further details regarding example synchronization protocols utilized by the execution platform 110 are discussed below in reference to FIGS. 5A and 5B.

If there is a remaining row count in the global limit (REMAINING ROW COUNT=TRUE), the execution node determines a number of rows that can be produced from its local buffer and moves to state 440. At state 440, the execution node outputs rows from its local buffer until the number of rows output from the local buffer reaches the determined number of rows, after which the execution node moves to state 450. If there is no remaining row count (REMAINING ROW COUNT=FALSE) or the execution node has exhausted its input, the execution node moves to state 440 where the execution node terminates processing of the query and stops outputting rows.

Figure 5A:
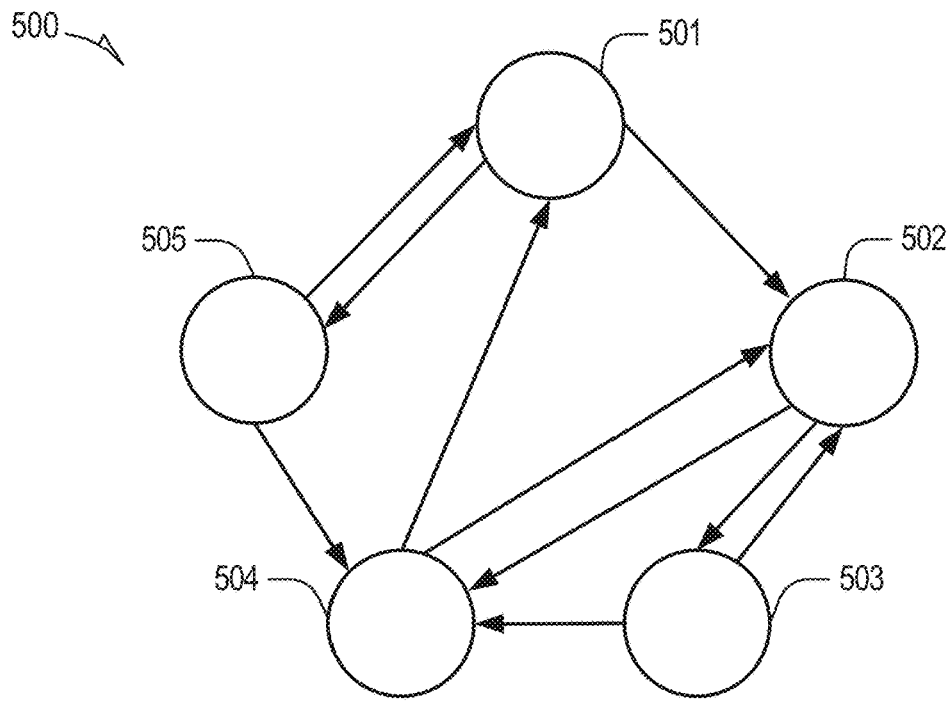
FIGS. 5A and 5B are conceptual diagrams illustrating example synchronization protocols used by execution nodes of the execution platform in processing limit queries, in accordance with some embodiments of the present disclosure.
Figure 5B:
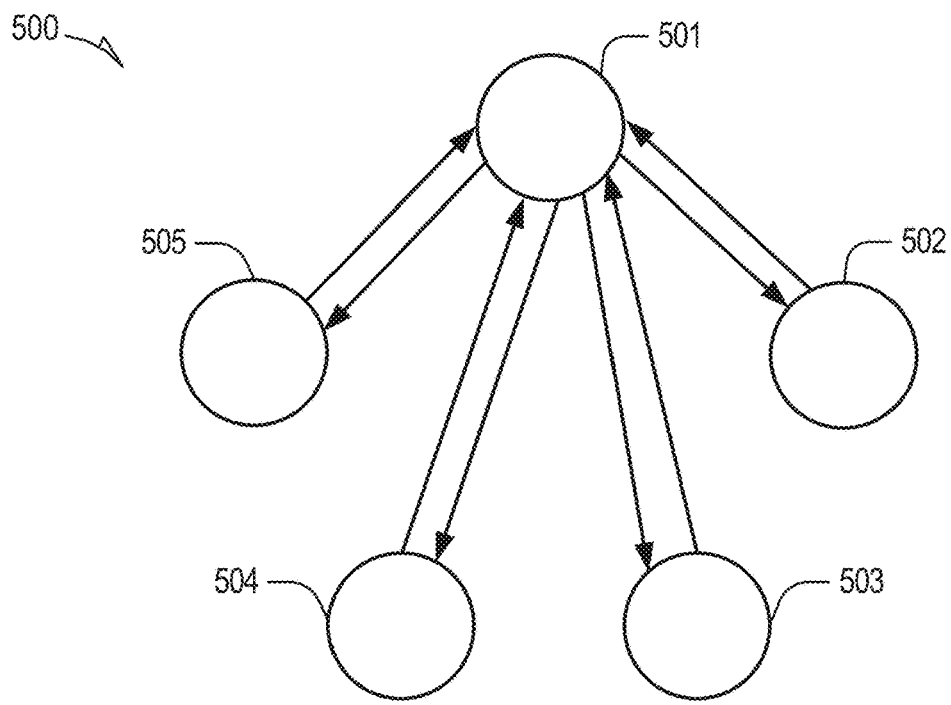

FIGS. 5A and 5B are conceptual diagrams illustrating example synchronization protocols used by execution nodes of the execution platform in processing limit queries, in accordance with some embodiments of the present disclosure. Shown in FIGS. 5A and 5B is a set of execution nodes 500 including execution nodes 501-505. A stop operator within each execution node 501-505 monitors the number of rows produced by the execution node and generates distributed row count data based therein. The distributed row count data includes a counter for the number of produced rows and a counter for the number of buffered rows for each execution node in the set of execution nodes and may further include an indicator of whether each execution node has terminated.

The distributed row count data may include a distributed row count table that organizes this information in rows and columns. A distributed row count table includes a row count for each execution node in the plurality of execution nodes. For example, Table 1 (shown below) provides an example local distributed row count table.

TABLE 1

|  | Node 501 | Node 502 | Node 503 | Node 504 | Node 505 |
| --- | --- | --- | --- | --- | --- |
| Terminated | FALSE | TRUE | FALSE | FALSE | TRUE |
| Row Count | 100 | 140 | 50 | 210 | 200 |
| Buffer Row Count | 0 | 5 | 0 | 10 | 40 |

The example distributed row count table provided above includes a column for each execution node in the set of execution nodes 500. The example distributed row count table includes three rows. A first row indicates whether the execution node has terminated, a second row indicates a row count for the node, and a third row indicates a buffer row count for the node. In some embodiments, the indication of whether the execution node has terminated may include or be based on the number of terminated instances within a given execution node. For example, in some embodiments, each execution node comprises a fixed number of processes that execute to process the query. In some embodiments, the distributed row count table includes an indicator of the number of terminated processes within an execution node, and if the number of terminated processes reaches the fixed number of processes, the stop operator may determine that the corresponding execution node has terminated its processing of the query.

A stop operator within each execution node maintains a local copy of the distributed row count data (referred to as "local distributed row count data"). The stop operators exchange distributed row count data with other execution nodes in the set of execution nodes 500 in accordance with a synchronization protocol that allows the set of execution nodes to synchronize row counts and determine when a global limit is reached.

With reference to FIG. 5A, the set of execution nodes 500 can utilize a gossip-based synchronization protocol in some embodiments. With the gossip-based approach, the stop operator within each execution node transmits its local distributed row count data to one or more other execution nodes chosen at random at a predetermined frequency while the execution node is processing the query and when the execution node terminates. Upon receiving distributed row count data from another execution node (referred to as "remote distributed row count data"), a given execution node merges local distributed row count data with the remote distributed row count data to update the local distributed row count data. In this manner, current distributed row count data is quickly propagated throughout the set of execution nodes 500 allowing the execution nodes 501-505 to quickly synchronize and make determinations as to whether local limits of one or more execution nodes can be increased and whether query processing is to terminate based on satisfaction of the global limit. For example, if an execution node sends it local distributed row count information at a frequency F to S (>=1) other execution nodes, this will result in exponential propagation in which each node's information is at a maximum of $$\log\left(\frac{M}{F*S}\right)$$

behind other node's information, where M is the number of nodes.

With reference to FIG. 5B, the set of execution nodes 500 can utilize a central-coordinator-based synchronization protocol, in some embodiments. As shown, with the central coordinator approach, a single execution node, execution node 501, in this example is responsible for compiling row count information from the nodes 502-505. Each of the nodes 502-505 provide the execution node 501 with a row count and buffer count at a predefined frequency along with an indicator of whether they have terminated. The execution node 501 compiles the information received from the nodes 502-505 to generate distributed row count data and the execution node 501 may provide the distributed row count data to each of the nodes 502-505, at a predefined frequency. In this example, the execution node 501 is further responsible for determining whether a local limit assigned to one or more of the execution nodes 502-505 can be increased based on one or more of the execution nodes terminating without reaching their local limit. Upon making this determination, the execution node 501 may communicate an indicator of increased local limit to one or more of the nodes 502-505.

In this example, the execution node 501 is further responsible for detecting a stopping condition based on the global limit being reached. To this end, the execution node 501 computes a global row count based on individual row counts of each node and a global buffer count based on individual buffer counts of each node, and compares sum of the global row count and global buffer count to the global limit. If the execution node 501 determines that the global limit has been reached, the execution node 501 may cause each of the nodes 501-505 to terminate processing of the limit query.

Figure 6:
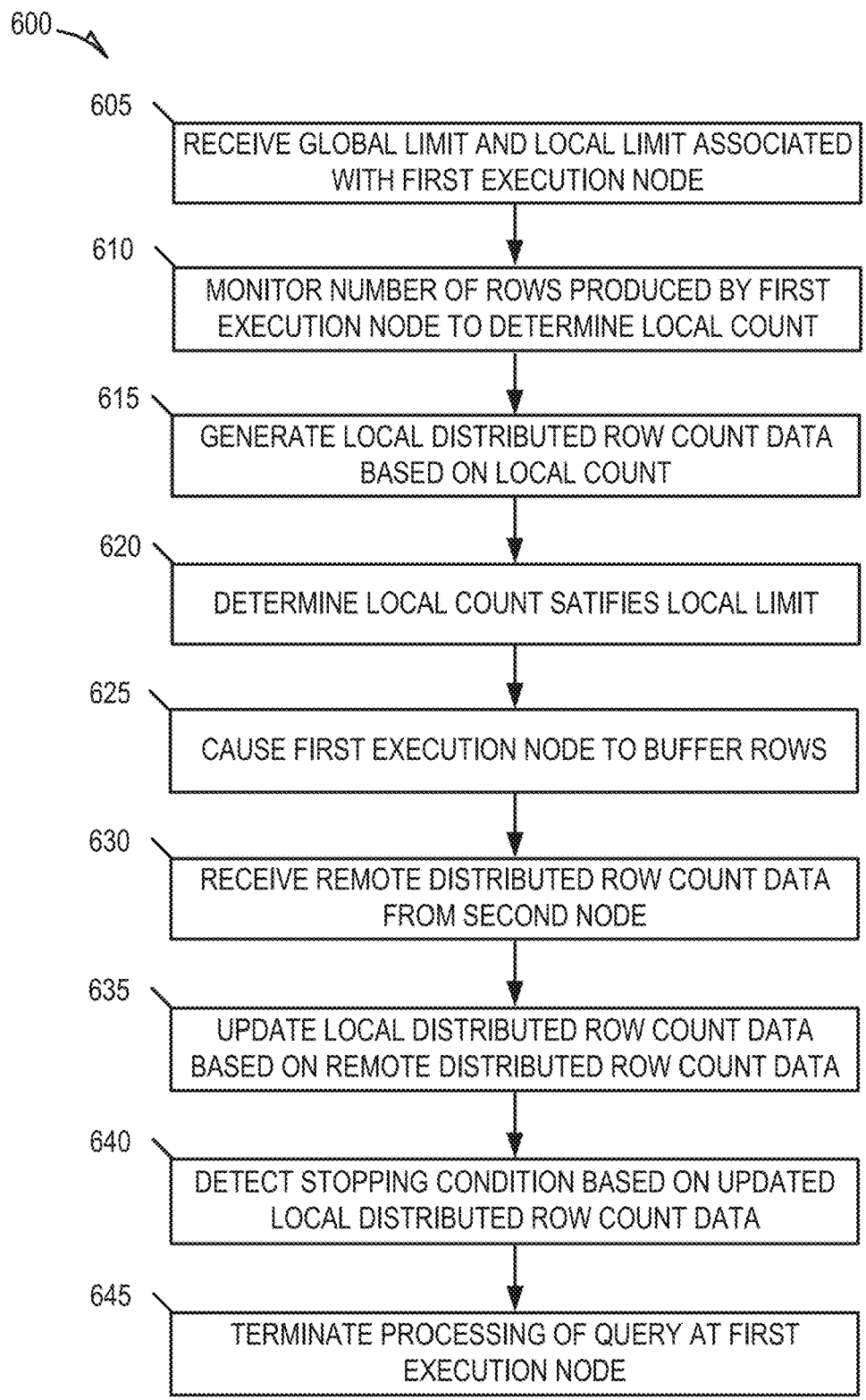
FIGS. 6-8 are flow diagrams illustrating operations of the network-based data warehouse system in performing a method for processing a limit query, in accordance with some embodiments of the present disclosure.
Figure 7:
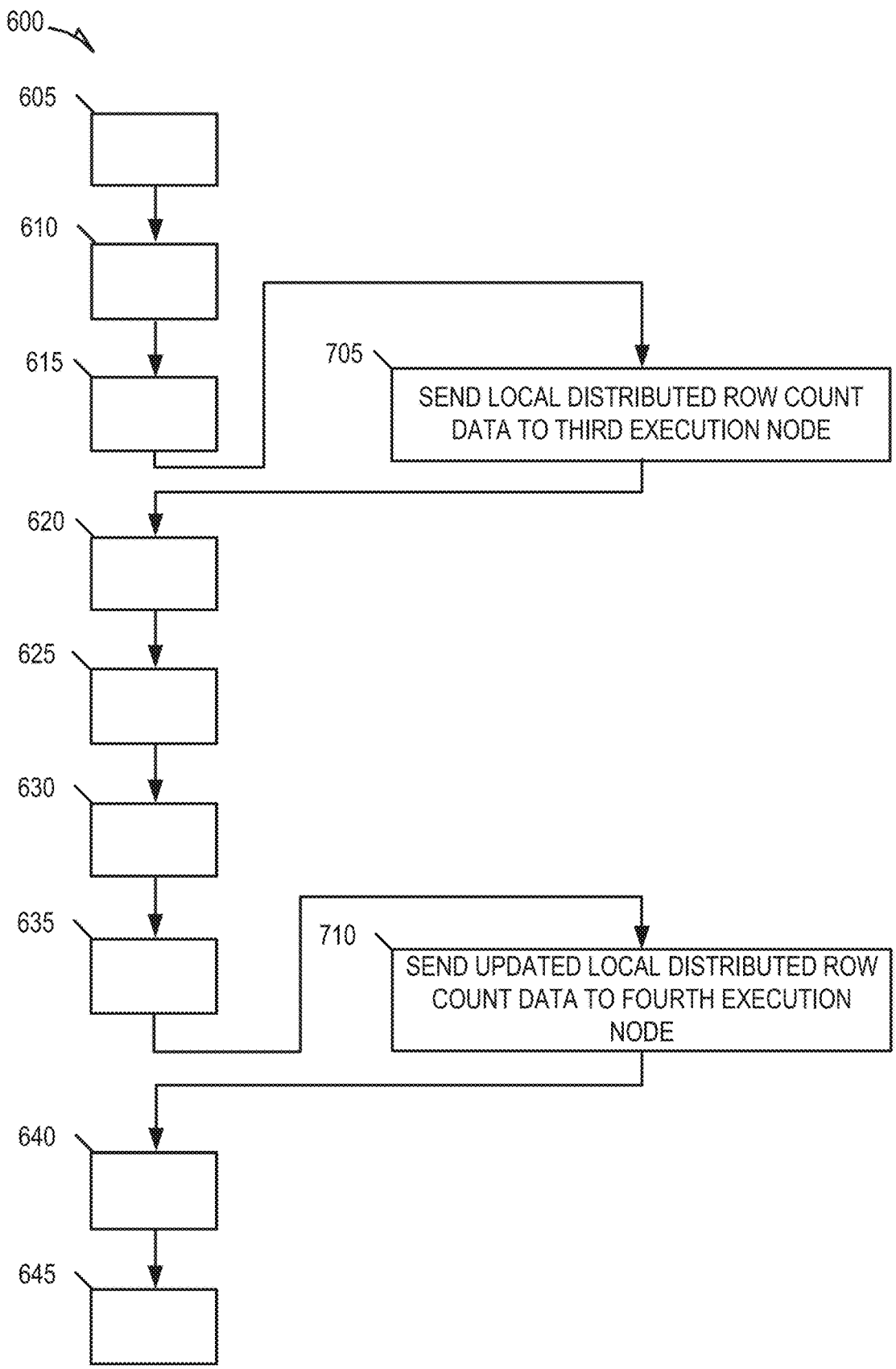
Figure 8:
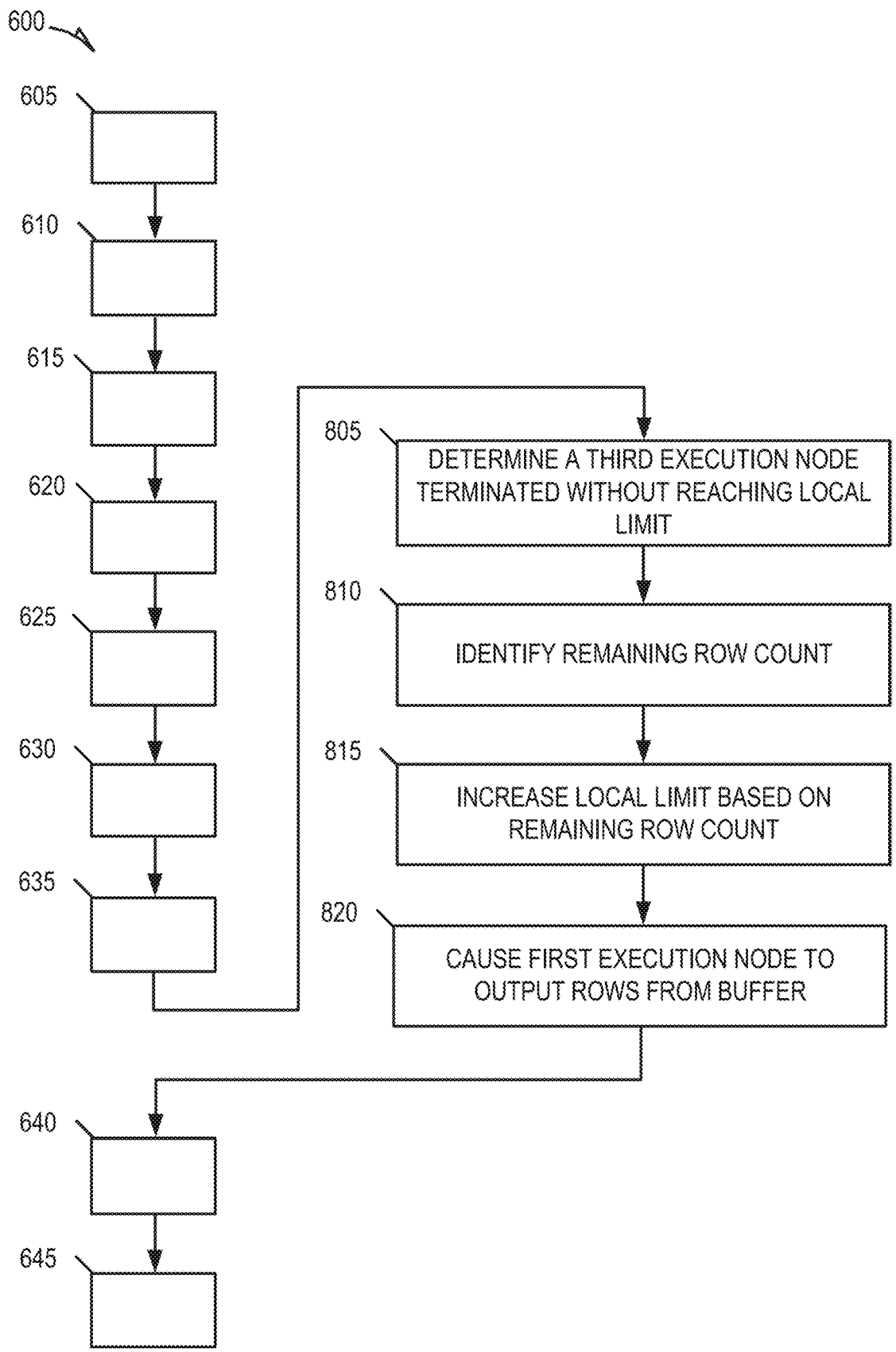

FIGS. 6-8 are flow diagrams illustrating operations of the network-based data warehouse system 102 in performing a method 600 for processing limit queries using a distributed stop operator, in accordance with some embodiments of the present disclosure. The method 600 may be embodied in computer-readable instructions for execution by one or more hardware components (e.g., one or more processors) such that the operations of the method 600 may be performed by a stop operator of an execution node within the execution platform 110. Accordingly, the method 600 is described below, by way of example with reference thereto. However, it shall be appreciated that the method 600 may be deployed on various other hardware configurations and is not intended to be limited to deployment within the stop operator.

Depending on the embodiment, an operation of the method 600 may be repeated in different ways or involve intervening operations not shown. Though the operations of the method 600 may be depicted and described in a certain order, the order in which the operations are performed may vary among embodiments, including performing certain operations in parallel.

At operation 605, a stop operator of a first execution node receives a global limit and a local limit associated with a limit query directed at a database. The global limit defines a limit on a number of rows output by a set of execution nodes assigned to processing the query. Each execution node may be assigned to a particular segment of the database, the segment of the database that is assigned to a given execution node is provided as input to the execution node. The global limit is based on a limit parameter that is specified in the limit query. The local limit defines a limit on a number of rows output by the first execution node. The local limit corresponds to a portion of the global limit and is determined (e.g., by the compute service manager 108) based on the number of execution nodes in the set of execution nodes. For example, the local limit assigned to the first execution node may be determined by dividing the global limit by the number of execution nodes. The global limit and local limit may be included in a query plan provided to the execution platform 110 by the compute service manager 108.

At operation 610, the stop operator monitors a number of rows output by the first execution node in processing the query to determine a local row count. That is, a process executing within the first execution node may produce rows in processing the query and output the produced rows to one or more downstream processes. To determine the local row count, the stop operator counts the number of rows output by the process to the one or more downstream processes.

At operation 615, the stop operator generates a local distributed row count data based in part on the local row count. The local distributed row count data includes the local row count corresponding to the first execution node and row counts associated with other execution nodes in the set of execution nodes that are processing the query. The local distributed row count data also includes a local buffer count and buffer counts associated with the other execution nodes in the set. The local distributed row count data may comprise a local distributed row count table that includes a row count and buffer count for each execution node along with an indicator of whether each execution node has terminated in response to consuming its entire input.

At operation 620, the stop operator determines the local row count satisfies the local limit. That is, the stop operator determines that the number of rows output by the first node has reached the number of rows defined by the local limit.

At operation 625, the stop operator causes the first execution node to buffer additional rows produced in processing the query. That is, the stop operator provides an instruction to a process within the first execution node that causes the process to add rows produced after reaching the local row count limit to a local buffer rather than outputting the rows to downstream operators.

At operation 630, the stop operator receives a remote distributed row count data from a second execution node. The remote distributed row count data includes a row count and buffer count for each of the execution nodes. At least one row count or buffer count includes an updated count relative to the row counts or buffer counts of the local distributed row count data maintained by the first execution node. The remote distributed row count data may include a remote distributed row count table.

At operation 635, the stop operator updates the local distributed row count data based on the remote distributed row count data received from the second execution node. The stop operator updates the local distributed row count data by merging the local distributed row count data with the remote distributed row count data. For example, the stop operator may merge a local distributed row count table with a remote distributed row count table to generate an updated local distributed row count table.

At operation 640, the stop operator detects a stopping condition based on the updated local distributed row count data. The stopping condition may be based on a comparison of a sum of a global row count and a global buffer count to the global limit. The stop operator can determine the global row count by computing a sum of individual row counts from each of the execution nodes. The stop operator can determine the global buffer count by computing a sum of individual buffer counts from each of the execution nodes. Accordingly, the stop operator may determine that the global limit is satisfied based on a combination of the global row count and the global buffer count.

At operation 645, the stop operator terminates the processing of the query by the first execution node in response to detecting the stopping condition. For example, the stop operator may provide instruction to a process in the execution node responsible for executing the query that causes the process to stop executing the query. Upon terminating the processing of the query, the first execution node stops producing rows.

As shown in FIG. 7, the method 600 may, in some embodiments, further include operations 705 and 710. Consistent with these embodiments, the operation 705 may be performed subsequent to the operation 615 where the stop operator generates the local distributed row count data. At operation 705, the stop operator sends the local distributed row count data to a third execution node. Depending on the synchronization protocol employed by the set of execution nodes, the third execution node may be randomly selected by the stop operator from the set of execution nodes assigned to process the query.

As shown, the operation 710 may be performed after the operation 635, where the stop operator updates the local distributed row count data. At operation 710, the stop operator sends the updated local distributed row count data to a fourth execution node. Depending on the synchronization protocol employed by the set of execution nodes, the fourth execution node may be randomly selected by the stop operator from the set of execution nodes assigned to process the query.

As noted above, the stop operator sends the local distributed row count data to the other execution nodes according to a synchronization protocol that manages exchange of row count data between the set of execution nodes. Consistent with some embodiments, the set of execution nodes may utilize a central-coordinator approach to synchronization of row count data. In these embodiments, the first execution node may serve as the central-coordinator, and upon detecting the stopping condition at operation 645, the first execution node may transmit a message to the other execution nodes to instruct the other execution nodes to stop processing the query.

In other embodiments, the set of execution nodes utilizes a gossip-based approach to synchronizing row count information. For example, the stop operator of the first execution node and each other execution node may send, at a frequency F, its local distributed row count table to S ($>=1$) other execution nodes chosen at random.

Accordingly, while the FIG. 7, illustrates the operations 705 and 710 being performed in a certain order, it shall be appreciate that the operation 705 may occur at any time after the stop operator has generated an initial local distributed row count data and the operation 710 may occur at any time after the stop operator has updated the local distributed row count data. In addition, the operations 705 and 710 may further be repeated multiple times during the execution of method 600.

As shown in FIG. 8, the method 600 may, in some embodiments, include operations 805, 810, and 815. Consistent with some embodiments, the operations 805, 810, and 815 may be performed subsequent to operation 635 where the stop operator updates the local distributed row count data. At operation 805, the stop operator determines, based on the updated distributed row count data, that a third execution node in the set of execution nodes has terminated without reaching its local limit thereby allowing the first execution node to output additional rows without the global row count of the set of execution nodes surpassing the global limit. For example, in some embodiments, the local distributed row count data includes an indication that a particular execution node has terminated along with an indication of the number of rows produced by the terminated execution node.

At operation 810, the stop operator identifies a remaining row count based on the updated local distributed row count data. As an example, the stop operator may compare the global row count to the global limit to determine the remaining row count. As another example, the stop operator may compare the number of rows output by the third execution node with a local row count limit assigned to the third node to determine a remaining row count.

At operation 815, the stop operator increases the local limit assigned to the first execution node based on the determined remaining row count. As an example, the stop operator may assume a portion of the remaining row count determined based on the number of execution nodes that are active (i.e., execution nodes that have not terminated).

At operation 820, the stop operator causes the first execution node to output one or more rows from the local buffer (e.g., to a downstream process) based on the increased local limit. That is, the stop operator causes the first execution node to output enough rows from the local buffer to satisfy the increased local limit for the first execution node.

While the FIG. 8, illustrates the operations 805, 810, and 815 being performed in a certain order, it shall be appreciated that the operations 805, 810, and 815 may occur at any time after the stop operator updates the local distributed row count data. For example, in some instances, the operations 805, 810, and 815 may occur prior to the stop operator determining the local count satisfies the local limit. Consistent with these embodiments, the stop operator need not cause the first execution node to output rows from its local buffer, but instead will allow the first execution node to continue producing rows as allowed by the increased local limit.

Figure 9:
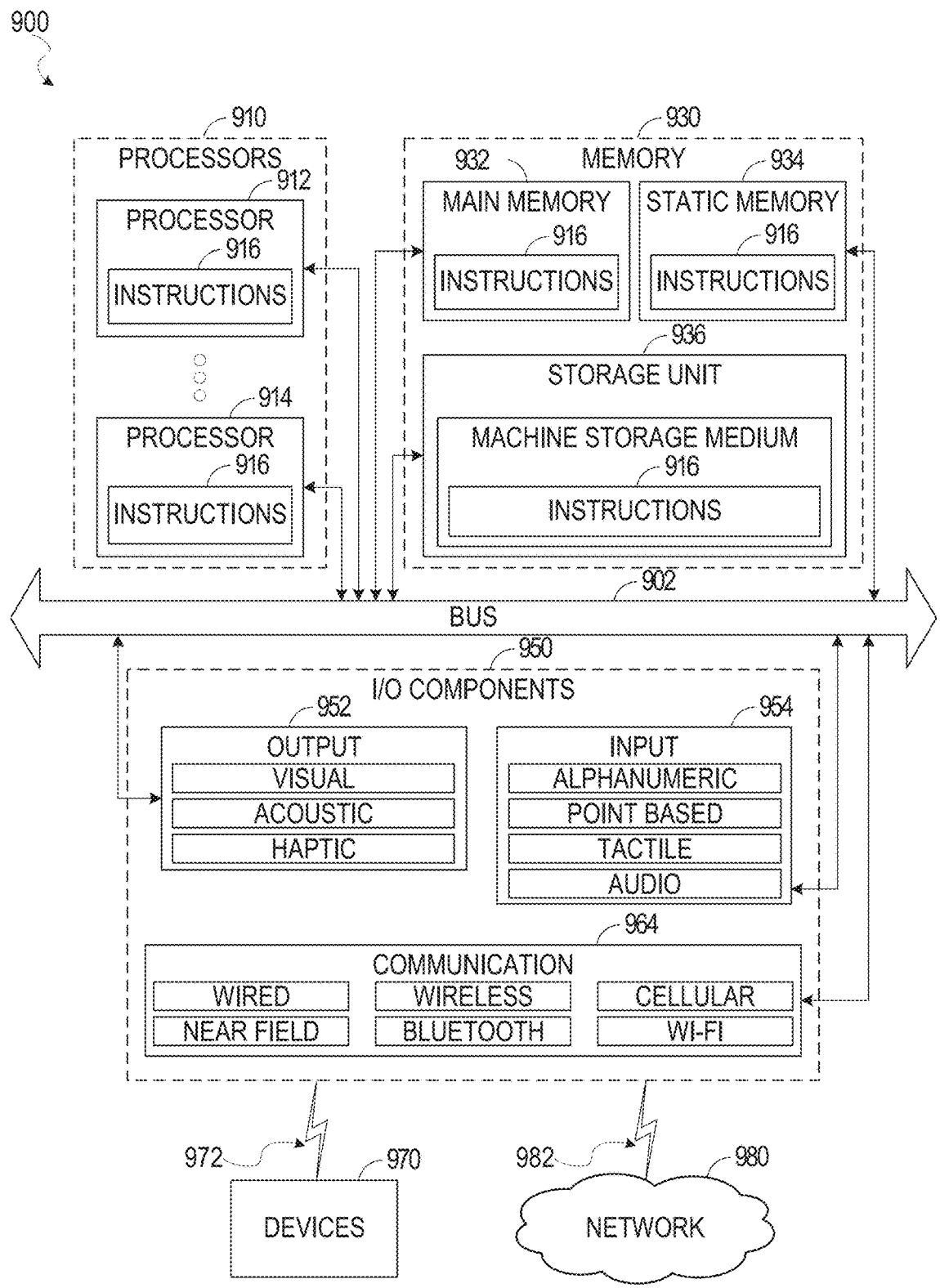
FIG. 9 illustrates a diagrammatic representation of a machine in the form of a computer system within which a set of instructions may be executed for causing the machine to perform any one or more of the methodologies discussed herein, in accordance with some embodiments of the present disclosure.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute any one or more operations of any one or more of the method 600. As another example, the instructions 916 may cause the machine 900 to implement portions of the functionality illustrated in any one or more of FIGS. 1-4, 5A, and 5B. In this way, the instructions 916 transform a general, non-programmed machine into a particular machine 900 (e.g., the compute service manager 108, an execution node in the execution platform 110, and the data storage devices 206) that is specially configured to carry out any one of the described and illustrated functions in the manner described herein.

In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 includes processors 910, memory 930, and input/output (I/O) components 950 configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors 910 that may comprise two or more independent processors (sometimes referred to as "cores") that may execute instructions 916 contemporaneously. Although FIG. 9 shows multiple processors 910, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 936, all accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's execution memory), or any suitable combination thereof, during execution thereof by the machine 900.

The I/O components 950 include components to receive input, provide output, produce output, transmit information, exchange information, capture measurements, and so on. The specific I/O components 950 that are included in a particular machine 900 will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, and other communication components to provide communication via other modalities. The devices 970 may be another machine or any of a wide variety of peripheral devices (e.g., a peripheral device coupled via a universal serial bus (USB)). For example, as noted above, the machine 900 may correspond to any one of the compute service manager 108, the execution platform 110, and the devices 970 may include the data storage device 206 or any other computing device described herein as being in communication with the network-based data warehouse system 102 or the storage platform 104.

Executable Instructions and Machine Storage Medium

The various memories (e.g., 930, 932, 934, and/or memory of the processor(s) 910 and/or the storage unit 936) may store one or more sets of instructions 916 and data structures (e.g., software) embodying or utilized by any one or more of the methodologies or functions described herein. These instructions 916, when executed by the processor(s) 910, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the method 600 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

EXAMPLES

Example 1 is a system comprising: a set of execution nodes to process a query directed to a database, each execution node from the set of execution nodes comprising at least one hardware processor, a first execution node from the set of execution nodes comprising a stop operator to perform operations comprising: receiving a global limit and a local limit associated with the query, the global limit defining a limit on a number of rows output by the set of execution nodes in processing the query, the local limit corresponding to a portion of the global limit and defining a limit on a number of rows output by the first execution node in processing the query; generating a local distributed row count data based a local row count corresponding to a number of rows output by the first execution node in processing the query; based on determining the local row count satisfies the local limit, causing the first execution node to buffer rows produced in processing the query; detecting a stopping condition based on determining the global limit is satisfied based on updated local distributed row count data; and terminating query processing by the first execution node based on detecting the stopping condition.

Example 2 includes the system of Example 1, wherein the operations further comprise: prior to terminating the processing of the query by the first execution node, identifying a remaining row count based on a second execution node terminating without reaching the local limit; increasing the local limit of the first execution node based on the remaining row count; and causing the first execution node to output one or more rows from the buffer based on an increased local limit.

Example 3 includes the system of any one or more Examples 1 and 2 wherein identifying the remaining row count comprises: determining a global row count based on the updated distributed row count data, the global row count corresponding to the number of rows output by the set of execution nodes in processing the query; and comparing a global row count to the global limit.

Example 4 includes the system of any one or more Examples 1-3 wherein the operations further comprise: sending the local distributed row count data to a third execution node, and sending the updated distributed row count data to a fourth execution node.

Example 5 includes the system of any one or more Examples 1-4 wherein the third execution node terminates query processing in response to the updated local distributed row count data.

Example 6 includes the system of any one or more Examples 1-5 wherein the operations further comprise: receiving remote distributed row count data from a second execution node in the set of execution nodes, the remote distributed row count data indicating a number of rows output by the second execution node in processing the query; and updating the local distributed row count data based on the remote distributed row count data, the updating of the local distributed row count data resulting in the updated local distributed row count data.

Example 7 includes the system of any one or more Examples 1-6 wherein the updating of the local distributed row count data comprises merging the local distributed row count data with the remote distributed row count data.

Example 8 includes the system of any one or more Examples 1-7 wherein: the local distributed row count data comprises a local distributed row count table, the local distributed row count data comprising a row count for each execution node in the set of execution nodes and an indication of whether each execution node has terminated, the remote distributed row count data comprises a remote distributed row count table, and the updating of the local distributed row count data comprises merging the local distributed row count table with the remote distributed row count table.

Example 9 includes the system of any one or more Examples 1-8 wherein the second execution node sends the remote distributed row count data to the first execution node based on the second execution node terminating after processing of the query.

Example 10 includes the system of any one or more Examples 1-9 wherein detecting the stopping condition comprises determining that a combination of a global row count determined from the updated local distributed row count data and a number of rows in a local buffer of the first execution node satisfy the global limit.

Example 11 is a method comprising: receiving, at a first execution node of a set of execution nodes processing a query, a global limit and a local limit associated with the query, the global limit defining a limit on a number of rows output by the set of execution nodes in processing the query, the local limit corresponding to a portion of the global limit and defining a limit on a number of rows output by the first execution node in processing the query; generating, by one or more processors, a local distributed row count data based a local row count corresponding to a number of rows output by the first execution node in processing the query; based on determining the local row count satisfies the local limit, causing the first execution node to buffer rows produced in processing the query; detecting a stopping condition based on determining the global limit is satisfied based on updated local distributed row count data; and terminating query processing by the first execution node based on detecting the stopping condition.

Example 12 includes the method of Examples 11 and further comprises prior to terminating the processing of the query by the first execution node, identifying a remaining row count based on a third execution node terminating without reaching the local limit; increasing the local limit of the first execution node based on the remaining row count; and causing the first execution node to output one or more rows from the buffer based on an increased local limit.

Example 13 includes the method of any one or more Examples 11 and 12 wherein identifying the remaining row count comprises: determining a global row count based on the updated distributed row count data, the global row count corresponding to the number of rows output by the set of execution nodes in processing the query; and comparing a global row count to the global limit.

Example 14 includes the method of any one or more Examples 11-13 and further comprises sending the local distributed row count data to a third execution node, and sending the updated distributed row count data to a fourth execution node.

Example 15 includes the method of any one or more Examples 11-14 wherein the third execution node terminates query processing in response to the updated local distributed row count data.

Example 16 includes the method of any one or more Examples 11-15 wherein the operations further comprise: receiving remote distributed row count data from a second execution node in the set of execution nodes, the remote distributed row count data indicating a number of rows output by the second execution node in processing the query; and updating the local distributed row count data based on the remote distributed row count data, the updating of the local distributed row count data resulting in the updated local distributed row count data.

Example 17 includes the method of any one or more Examples 11-16 wherein the updating of the local distributed row count data comprises merging the local distributed row count data with the remote distributed row count data.

Example 18 includes the method of any one or more Examples 11-17 wherein the local distributed row count data comprises a local distributed row count table, the local distributed row count data comprising a row count for each execution node in the set of execution nodes and an indication of whether each execution node has terminated, the remote distributed row count data comprises a remote distributed row count table, and the updating of the local distributed row count data comprises merging the local distributed row count table with the remote distributed row count table.

Example 19 includes the method of any one or more Examples 11-18 wherein the second execution node sends the remote distributed row count data to the first execution node based on the second execution node terminating after processing of the query.

Example 20 includes the method of any one or more Examples 11-19 wherein detecting the stopping condition comprises determining that a combination of a global row count determined from the updated local distributed row count data and a number of rows in a local buffer of the first execution node satisfy the global limit.

Example 21 is a computer-storage medium comprising instructions that, when executed by one or more processors of a machine, configure the machine to perform operations comprising: receiving, at a first execution node of a set of execution nodes processing a query, a global limit and a local limit associated with the query, the global limit defining a limit on a number of rows output by the set of execution nodes in processing the query, the local limit corresponding to a portion of the global limit and defining a limit on a number of rows output by the first execution node in processing the query; generating, by one or more processors, a local distributed row count data based a local row count corresponding to a number of rows output by the first execution node in processing the query; based on determining the local row count satisfies the local limit, causing the first execution node to buffer rows produced in processing the query; detecting a stopping condition based on determining the global limit is satisfied based on updated local distributed row count data; and terminating query processing by the first execution node based on detecting the stopping condition.

Example 22 includes the computer-storage medium of Example 21, wherein the operations further comprise prior to terminating the processing of the query by the first execution node, identifying a remaining row count based on a third execution node terminating without reaching the local limit; increasing the local limit of the first execution node based on the remaining row count; and causing the first execution node to output one or more rows from the buffer based on an increased local limit.

Example 23 includes the computer-storage medium of any one or more of Examples 21 and 22, wherein identifying the remaining row count comprises: determining a global row count based on the updated distributed row count data, the global row count corresponding to the number of rows output by the set of execution nodes in processing the query; and comparing a global row count to the global limit.

Example 24 includes the computer-storage medium of any one or more of Examples 21-23, wherein the operations further comprise: sending the local distributed row count data to a third execution node, and sending the updated distributed row count data to a fourth execution node.

Example 25 includes the computer-storage medium of any one or more of Examples 21-24, wherein the third execution node terminates query processing in response to the updated local distributed row count data.

Example 26 includes the computer-storage medium of any one or more Examples 21-25 wherein the operations further comprise: receiving remote distributed row count data from a second execution node in the set of execution nodes, the remote distributed row count data indicating a number of rows output by the second execution node in processing the query; and updating the local distributed row count data based on the remote distributed row count data, the updating of the local distributed row count data resulting in the updated local distributed row count data.

Example 27 includes the computer-storage medium of any one or more of Examples 21-26, wherein the updating of the local distributed row count data comprises merging the local distributed row count data with the remote distributed row count data.

Example 28 includes the computer-storage medium of any one or more of Examples 21-27, wherein: the local distributed row count data comprises a local distributed row count table, the local distributed row count data comprising a row count for each execution node in the set of execution nodes and an indication of whether each execution node has terminated, the remote distributed row count data comprises a remote distributed row count table, and the updating of the local distributed row count data comprises merging the local distributed row count table with the remote distributed row count table.

Example 29 includes the computer-storage medium of any one or more of Examples 21-28 wherein the local limit is determined based on the global limit and a number of execution nodes in the set of execution nodes.

Example 30 includes the computer-storage medium of any one or more of Examples 21-29 wherein detecting the stopping condition comprises determining that a combination of a global row count determined from the updated local distributed row count data and a number of rows in a local buffer of the first execution node satisfy the global limit.

The invention claimed is:

1. A system comprising:
    a set of execution nodes to process a query directed to a database, each execution node of the set of execution nodes comprising at least one hardware processor, a first execution node of the set of execution nodes comprising:
    a local buffer; and
    a stop operator to perform operations comprising:
    sending local distributed row count data to a second execution node of the set of execution nodes, the local distributed row count data comprising at least a local row count comprising a first number of rows output by the first execution node in processing the query, the local distributed row count data causing the second execution node to terminate query processing;
    causing the first execution node to add one or more rows produced in processing the query to the local buffer based on the local distributed row count data;
    receiving remote distributed row count data from the second execution node, the remote distributed row count data including a distributed row count comprising a second number of rows output by at least the second execution node and a third execution node of the set of execution nodes in processing the query;
    determining a global buffer count based on a combination of a local buffer count maintained by the first execution node and a global number of rows buffered by the set of execution nodes, the local buffer count corresponding to a third number of rows in the local buffer of the first execution node, the global number of rows comprising a fourth number of rows in local buffers of at least the second execution node and the third execution node;
    detecting a stopping condition based on determining a combined sum of the local row count, the distributed row count, and the global buffer count satisfy a row limit associated with the query; and
    terminating query processing by the first execution node based on detecting the stopping condition.

2. The system of claim 1, wherein the operations further comprise:
    generating the local distributed row count data based on the local row count.

3. The system of claim 1, wherein the operations further comprise sending the local distributed row count data to a fourth execution node of the set of execution nodes.

4. The system of claim 1, wherein the second execution node provides the remote distributed row count data to the first execution node based on the second execution node terminating query processing.

5. The system of claim 1, wherein the operations further comprise:

generating updated local distributed row count data by updating the local distributed row count data based on the remote distributed row count data received from the second execution node; and sending the updated distributed row count data to the third execution node.

6. The system of claim 5, wherein the local distributed row count data comprises a local distributed row count table, the local distributed row count table comprising a row count for each execution node in the set of execution nodes, a buffer count for each execution node in the set of execution nodes, and an indication of whether each execution node has terminated, the remote distributed row count data comprises a remote distributed row count table, and the generating of the updated local distributed row count data comprises merging the local distributed row count table with the remote distributed row count table.

7. The system of claim 5, wherein the generating the updated local distributed row count data includes updating a global row count maintained by the first execution node based on the number of rows output by the second execution node, the global row count indicating a combined total number of rows output by execution nodes of the set of execution nodes.

8. The system of claim 1, wherein:

the operations further comprise determining a global row count based on the local row count maintained by the first execution node and the distributed row count included in the remote distributed row count data received from the second execution node.

9. The system of claim 1, wherein: the operations further comprise:

receiving a local limit associated with the query, the local limit corresponding to a portion of the row limit, wherein the causing of the first execution node to add the one or more rows to the local buffer is based on determining the number of rows output by the first execution node satisfies the local limit.

10. The system of claim 9, wherein the operations further comprise:

determining an increased local limit for the first execution node based on the second execution node terminating query processing; and causing the first execution node to output at least one row from the local buffer based on the increased local limit.

11. The system of claim 9, wherein:

the remote distributed row count data received from the second execution node comprises the fourth number of rows buffered by at least the second execution node and the third execution node of the set of execution nodes.

12. A method comprising:

sending, by a first execution node of a set of execution nodes processing a query, local distributed row count data a second execution node of the set of execution nodes, the local distributed row count data comprising at least a local row count comprising a first number of rows output by the first execution node in processing the query, the local distributed row count data causing the second execution node to terminate query processing, each execution node of the set of execution nodes comprising at least one hardware processor;

adding one or more rows produced in processing the query to a local buffer of the first execution node based on the local distributed row count data;

receiving remote distributed row count data from the second execution node, the remote distributed row count data including a distributed row count comprising a second number of rows output by at least the second execution node and a third execution node of the set of execution nodes in processing the query;

determining a global buffer count based on a combination of a local buffer count maintained by the first execution node and a global number of rows buffered by the set of execution nodes, the local buffer count corresponding to a third number of rows in the local buffer of the first execution node, the global number of rows comprising a fourth number of rows in local buffers of at least the second execution node and the third execution node;

detecting a stopping condition based on determining a combined sum of the local row count, the distributed row count, and the global buffer count satisfy a row limit associated with the query; and terminating query processing by the first execution node based on detecting the stopping condition.

13. The method of claim 12, further comprising:
generating the local distributed row count data based on the local row count.

14. The method of claim 13, wherein:
the second execution node provides the remote distributed row count data to the first execution node based on the second execution node terminating query processing.

15. The method of claim 12, further comprising:
generating updated local distributed row count data by updating the local distributed row count data based on the remote distributed row count data received from the second execution node; and sending the updated distributed row count data to the third execution node.

16. The method of claim 15, wherein the local distributed row count data comprises a local distributed row count table, the local distributed row count table comprising a row count for each execution node in the set of execution nodes, a buffer count for each execution node in the set of execution nodes, and an indication of whether each execution node has terminated, the remote distributed row count data comprises a remote distributed row count table, and the generating of the updated local distributed row count data comprises merging the local distributed row count table with the remote distributed row count table.

17. The method of claim 15, wherein the generating the updated local distributed row count data includes updating a global row count maintained by the first execution node based on the number of rows output by the second execution node, the global row count indicating a combined total number of rows output by execution nodes of the set of execution nodes.

18. The method of claim 17, further comprising determining the global row count based on the local row count maintained by the first execution node and the distributed row count included in the remote distributed row count data received from the second execution node.

19. The method of claim 12, further comprising:

receiving a local limit associated with the query, the local limit corresponding to a portion of the row limit, wherein the adding of the one or more rows to the local buffer is based on determining the number of rows output by the first execution node satisfies the local limit;

determining an increased local limit for the first execution node based on the second execution node terminating query processing; and outputting, by the first execution node, at least one row from the local buffer based on the increased local limit.

20. One or more computer-storage media comprising instructions that, when executed by one or more processors of a first execution node in a set of execution nodes processing a query, configure the first execution node to perform operations comprising:

sending local distributed row count data to a second execution node of the set of execution nodes, the local distributed row count data comprising at least a local row count comprising a first number of rows output by the first execution node in processing the query, the local distributed row count data causing the second execution node to terminate query processing, each execution node of the set of execution nodes comprising at least one hardware processor;

adding one or more rows produced in processing the query to a local buffer of the first execution node based on the local distributed row count data;

receiving remote distributed row count data from the second execution node, the remote distributed row count data including a distributed row count comprising a second number of rows output by at least the second execution node and a third execution node of the set of execution nodes in processing the query;

determining a global buffer count based on a combination of a local buffer count maintained by the first execution node and a global number of rows buffered by the set of execution nodes, the local buffer count corresponding to a third number of rows in the local buffer of the first execution node, the global number of rows comprising a fourth number of rows in local buffers of at least the second execution node and the third execution node;

detecting a stopping condition based on determining a combined sum of the local row count, the distributed row count, and the global buffer count satisfy a row limit associated with the query; and terminating query processing by the first execution node based on detecting the stopping condition.

* * * * *